United States Patent
Bains

(10) Patent No.: US 12,210,456 B2
(45) Date of Patent: Jan. 28, 2025

(54) DYNAMIC RANDOM ACCESS MEMORY (DRAM) WITH SCALABLE META DATA

(71) Applicant: Intel Corporation, Santa Clara, CA (US)

(72) Inventor: Kuljit S. Bains, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 740 days.

(21) Appl. No.: 17/214,749

(22) Filed: Mar. 26, 2021

(65) Prior Publication Data

US 2021/0286727 A1   Sep. 16, 2021

(51) Int. Cl.
| G06F 12/0862 | (2016.01) |
| G06F 12/0879 | (2016.01) |
| G06F 12/0882 | (2016.01) |
| G06F 13/16 | (2006.01) |

(52) U.S. Cl.
CPC ...... *G06F 12/0862* (2013.01); *G06F 12/0879* (2013.01); *G06F 12/0882* (2013.01); *G06F 13/1668* (2013.01); *G06F 2212/7207* (2013.01)

(58) Field of Classification Search
CPC ............. G06F 12/0862; G06F 12/0879; G06F 12/0882; G06F 13/1668; G06F 2212/7207; G06F 2212/1032; G06F 2212/1056; G06F 2212/466; G06F 12/0868; G06F 2212/6022; G06F 3/0614; G06F 3/0625; G06F 3/0656; G06F 3/0679

See application file for complete search history.

(56) References Cited

U.S. PATENT DOCUMENTS

| 8,468,433 B2 | 6/2013 | Bains et al. |
| 8,806,298 B2 | 8/2014 | Bains |
| 9,158,616 B2 | 10/2015 | Bains et al. |
| 9,558,066 B2 | 1/2017 | Bonen et al. |
| 9,904,591 B2 | 2/2018 | Halbert et al. |
| 9,948,299 B2 | 4/2018 | Bains et al. |
| 10,108,512 B2 | 10/2018 | Halbert et al. |
| 10,496,473 B2 | 12/2019 | Das et al. |
| 10,810,079 B2 | 10/2020 | Halbert et al. |
| 10,839,887 B2 | 11/2020 | Cox et al. |
| 10,949,296 B2 | 3/2021 | Halbert et al. |
| 11,314,589 B2 | 4/2022 | Bains et al. |
| 2015/0067437 A1 | 3/2015 | Bains et al. |

(Continued)

FOREIGN PATENT DOCUMENTS

| CN | 111753336 A | * 10/2020 | ......... G06F 12/1027 |
| EP | 2546751 A1 | * 1/2013 | ......... G06F 12/0246 |
| WO | 2022066178 A1 | 3/2022 | |

OTHER PUBLICATIONS

CN-11175336-A translation (Published Date: Oct. 9, 2020).*

*Primary Examiner* — Zhuo H Li

(74) *Attorney, Agent, or Firm* — Compass IP Law PC

(57) ABSTRACT

A memory is described. The memory includes row buffer circuitry to store a page. The page is divided into sections, wherein, at least one of the sections of the page is to be sequestered for the storage of meta data, and wherein, a first subset of column address bits is to: 1) define a particular section of the page, other than the at least one sequestered sections of the page, whose data is targeted by a burst access; and, 2) define a field within the at least one of the sequestered sections of the page that stores meta data for the particular section.

18 Claims, 12 Drawing Sheets

(56) References Cited

U.S. PATENT DOCUMENTS

| | | |
|---|---|---|
| 2016/0378366 A1 | 12/2016 | Tomishima et al. |
| 2019/0384711 A1* | 12/2019 | Lv ....................... G06F 12/0882 |
| 2022/0027372 A1* | 1/2022 | Schreter ............. G06F 16/2428 |
| 2024/0061741 A1 | 2/2024 | Agarwal et al. |
| 2024/0069763 A1* | 2/2024 | Sugimori ................ G06F 12/00 |

* cited by examiner

DYNAMIC RANDOM ACCESS MEMORY (DRAM) WITH SCALABLE META DATA

FIELD OF INVENTION

The field of invention pertains generally to the computing sciences and, more specifically, to a dynamic random access memory (DRAM) with scalable meta data.

BACKGROUND

Increasingly computing systems designers are seeking ways to store meta data with the units of (e.g., customer) data that are stored within a memory system. For example, central processing units (CPUs) commonly access a main memory system in units of 64B cache lines. The ability to store meta data with each cache line is increasingly becoming more desirable yet the memory chips that are used to implement the memory system do not include any native resources for the storage of such meta data. As such, additional memory chips have to be added for the storage of meta data and/or memory chips used for other functions than the storage of customer data (e.g., ECC memory chips) are used for the storage of meta data. The former adds expense while the later risks data reliability.

FIGURES

A better understanding of the present invention can be obtained from the following detailed description in conjunction with the following drawings, in which:

FIGS. 5a and 5b show a first embodiment of operation for an X16 memory;

DETAILED DESCRIPTION

Figure 1:
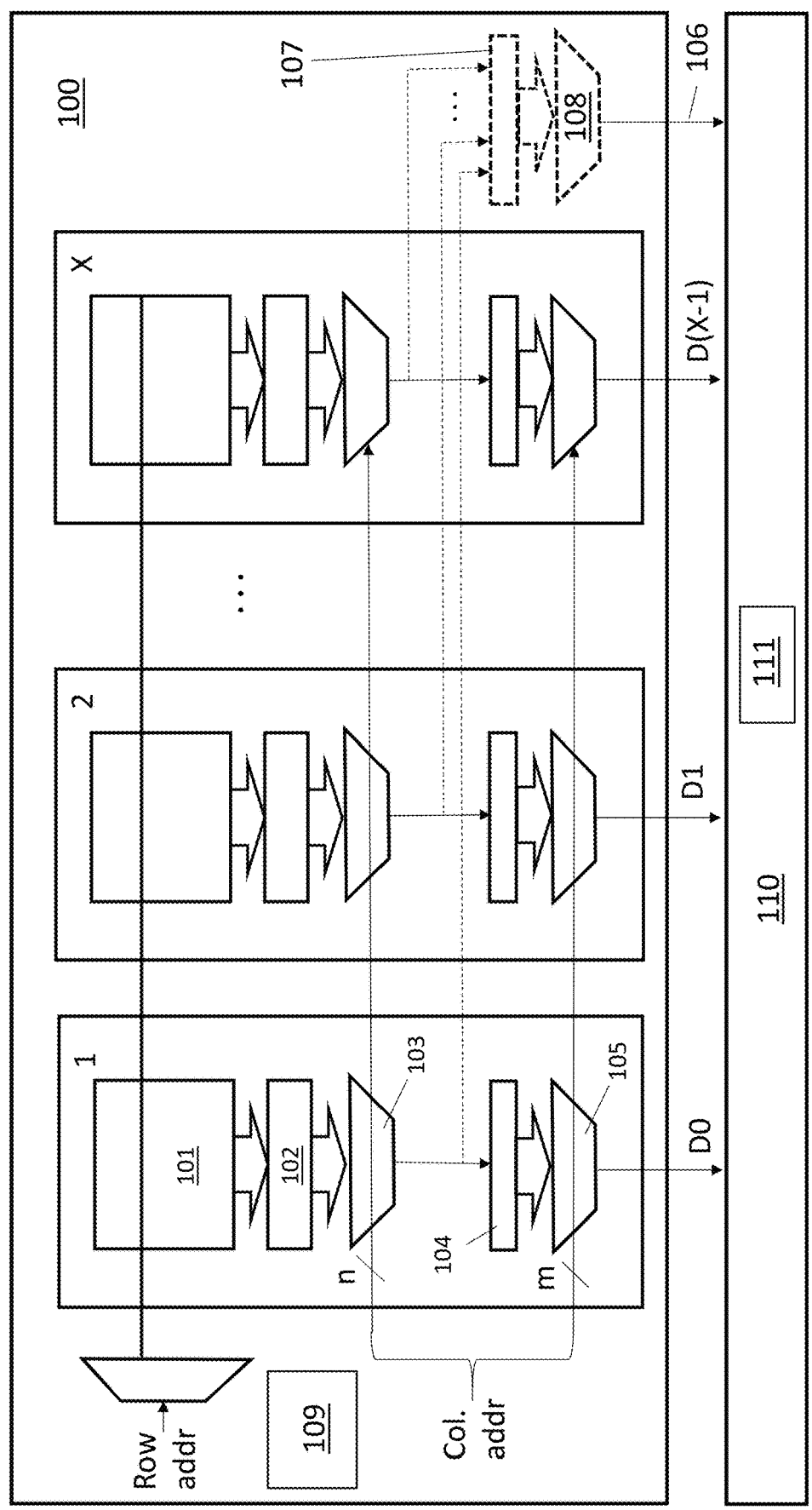
FIG. 1 shows an improved memory.

FIG. 1 shows a high level view of an improved dynamic random access memory (DRAM) memory chip. For ease of drawing, FIG. 1 only shows the main architectural features of the memory's read datapath. As described in the immediately following discussion, the memory provides for meta data to be transferred as part of a burst transfer process.

In operation, the memory receives a read or write command and a corresponding address. The address is divided into a bank component, a row component and a column component. The memory includes an array of memory banks and the bank component of the address resolves to a particular bank in the bank array. For ease of drawing FIG. 1 only depicts the particular bank that is identified by the bank component of the address.

As observed in FIG. 1, within a bank, each data I/O pin can be viewed has having its own dedicated memory array 101 (for ease of drawing, only the features of the first read data path are labeled). This can be accomplished, e.g., with separate memory arrays that store a single bit per array location (as observed in FIG. 1), or, with a single array that stores a number of bits equal to the number of data I/O pins per array location (or some combination thereof). For ease of explanation the following discussion assumes there is a separate memory for each data I/O pin.

When the memory receives an address, the row component of the address is resolved to a same, particular row within each of the targeted bank's memory arrays 101. Software programs tend to call numerically similar memory addresses when reading from or writing to memory. As such, a memory system is viewed as being composed of different "pages". When a software program jumps to a new address range it activates the corresponding page in memory. Commonly, a number of immediately following addresses that are called by the software target the same page.

Here, each particular row within the memory arrays 101 corresponds to a different page in the memory. When a particular page is first accessed, the page's corresponding row is activated. The contents at each column of each memory array 101 along the row are then loaded into row buffers 102 (each memory array has its own associated row buffer 102). As such, when a row is first accessed, each row buffer 102 receives the entire page for its memory array 101.

Once the memory page contents are loaded into the row buffers 102, if one or more immediately following accesses target the same page, such accesses will enjoy faster access to the page's content via the row buffers 102 (rather than slower access to/from the memory arrays 101).

Figure 2:
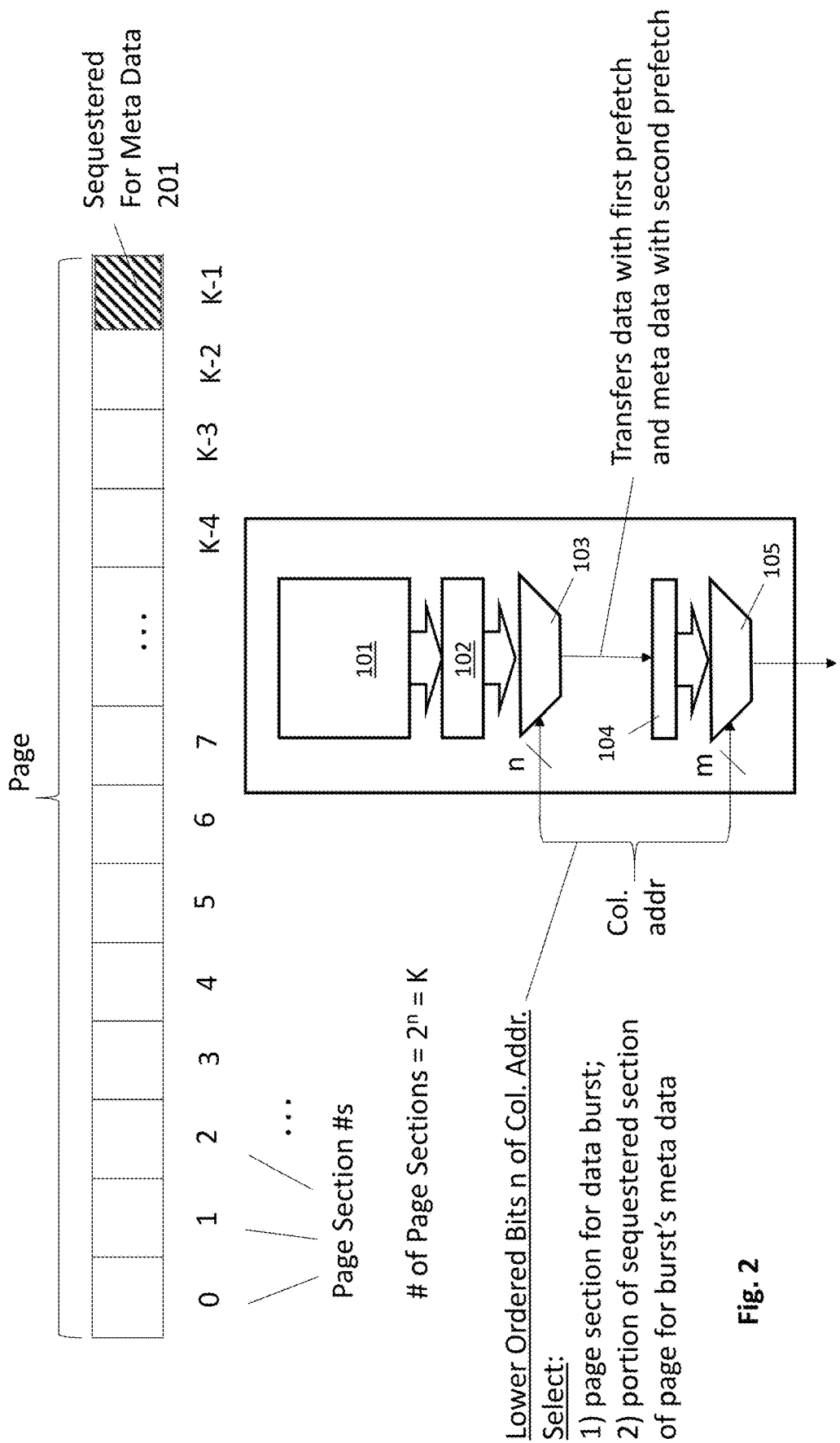
FIG. 2 shows a page with a section sequestered for meta data.

Referring to FIG. 2, the page that is stored in each row buffer can be viewed as a number K of different data sections. A number (n) of lower ordered bits of the column address component identify a particular data section while a number of higher ordered (m) bits of the column address component identify a particular column within the chosen section.

In computing systems, CPU accesses to/from memory are typically made in units of cache lines which require a series of consecutive data transfers between the host and memory. For example, in the case of a DDR6 memory channel, the width of the data bus is 16b (excluding ECC). If the memory channel is implemented with X4 memory chips, a rank of four memory chips creates a 16b wide data channel.

The size of a traditional cache line is 64B. In order to transfer a 64B cache line as a single unit, the memory chips employ a "burst" mode that performs 32 consecutive data transfers between the memory and the host ((16b/cycle)(32 cycles)=512b=64B). As such, when in "burst" mode, the memory of FIG. 1 will consecutively transfer 32 bits at each of its output pins.

In the memory of FIG. 1, prefetch buffers 104 are used to feed the consecutive transfers of a burst read. Here, for each I/O pin's associated read data channel, a first multiplexer 103 selects 103 data from the section of the page that is identified by the lower ordered n bits and loads the section into a prefetch buffer 104.

According to the particular embodiment depicted in FIG. 1, the first multiplexer 103 selects the entire section that is pointed to by the lowered ordered n bits and loads the entire section into the prefetch buffer 104. A second multiplexer 105 then uses the remaining m higher ordered column address bits to select the correct portion of bits within the section to feed the burst.

According to another embodiment, the second multiplexer 105 is integrated with the first multiplexer 103 such that only the bits needed to feed the burst are selected and loaded into the prefetch buffer 104.

Regardless of which approach is adopted, the correct bits for the burst are sequentially transmitted over the data pin from the prefetch buffer. For ease of explanation the following discussion will mainly assume the first approach is adopted.

As an example, consider a memory where X=4 and n=5. The memory is an X4 memory (X=4). The n=5 lower ordered bits C0-C4 determine which section of a memory page is being accessed for a burst. As such, there are 32 sections per page ($2^5$=32). Additionally, there are 64b per section within each individual row buffer 102 resulting in 256b per section when the page is defined in terms of the total memory capacity across all four memory arrays (64b× 4=256b). This corresponds to a total page size across all four memory arrays of 1 KB (256b×32=8192b=1024B).

As such, in order to perform the above identified burst transfer, the targeted section (64b) is selected by the first multiplexer 103 along each datapath and loaded into the corresponding prefetch buffer 104 (i.e., a total of 256b of data is pre-fetched within the memory). If the second multiplexing approach were adopted, only 32b of data would be loaded into the prefetch buffer 104 per datapath (resulting in a total of 128b of data being prefetched within the memory).

In order to additionally support the meta data transfer, referring briefly to FIG. 2, one section 201 in each row buffer is reserved (sequestered) for meta data information. Thus, continuing with the above example, from the perspective of the host, each page corresponds to 31 sections of data (256×31=7936b=992B).

Figure 3B:
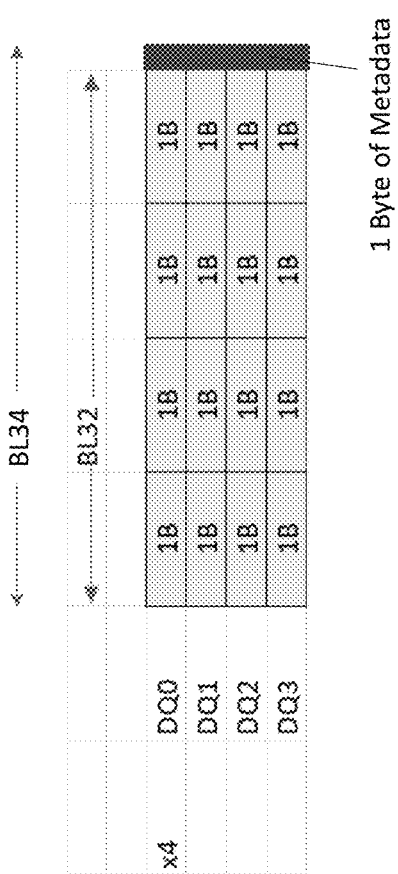
FIGS. 3a and 3b show a first embodiment of operation for an X4 memory.
Figure 3A:
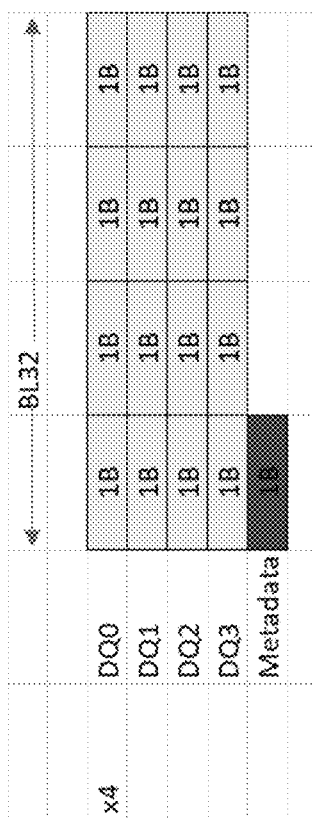

According to an embodiment, one byte of meta data is transferred per burst per four I/O pins. Thus, if X=4, one byte of meta data is transferred with a burst of 32b over each of the memory's four I/O pins. According to a first approach, observed in FIG. 3a, the meta data is transferred simultaneously with the data over an additional I/O pin 106. According to a second approach, observed in FIG. 2b, the additional pin 106 and its supporting datapath elements 107, 108 do not exist and the meta data is multiplexed over the four data I/O pins (D0-D3), e.g., immediately after the 32b of data has been transferred over each of the four I/O pins.

In order to include the meta data with the burst, along each datapath, the meta data is prefetched and loaded into the prefetch buffer 104. In an embodiment, 2 bits are reserved in the section 201 that has been sequestered for the meta data for each of the four datapaths. Here, again in the particular example, across all four datapaths, the section size is 256b where 31 sections per page are used for data and one section per page is sequestered for meta data. As such, one byte of meta data can be reserved for each section of data in the page (256b/8=32).

Because the sequestered meta data section is divided into a same number of sections as the page, the same C0-C4 lower ordered bits of the column address can be used to fetch the correct meta data for any particular section/burst. That is, recalling that bits C0-C4 of the column address are used to identify the particular section that is targeted by the burst access, because the sequestered meta data section reserves meta data on a per section basis, the C0-C4 meta data bits can also be used to fetch the correct meta data for each of the other sections of data of the page.

As such, the logic circuitry of the first multiplexer 103 within each datapath is designed to additionally fetch the meta data for the particular section that is sourcing a burst. Specifically, after the multiplexer 103 has selected the section of data targeted by the burst and has forwarded it to the prefetch buffer 104, the second multiplexer next accesses the section of the row buffer 102 that corresponds to the meta data and selects the particular 2 bits within that section that are reserved for the section of data that is targeted by the burst. Alternatively, some larger section of the meta data can be chosen and a second multiplexer 105 (which would also receive the C0-C4 bits) would select the correct 2 bits for the particular burst.

In the case of the first approach of FIG. 2a (additional pin), the meta data that is selected by the first multiplexer 103 is routed to an additional prefetch buffer 107 that feeds the additional pin 106. In a basic approach in which only the correct 2 bits are passed from the first multiplexer 103 to the additional prefetch buffer 107, the additional prefetch buffer collects a full byte of meta data information from the four memory arrays combined. The second multiplexer 108 then streams the byte of information with eight consecutive one bit transfers as depicted in FIG. 2a. If the additional prefetch buffer 107 receives more than the correct 2 bits per datapath, the second multiplexer is designed to receive the C0-C4 bits and selects the correct byte of information from the larger data field in the additional prefetch buffer 107. The meta data is presented at the later cycles of the burst to give the first multiplexer 103 time to select the meta data and load the additional prefetch buffer 107 after it has loaded the other prefetch buffers 104 with data.

In the case of the second approach of FIG. 2b (no additional pin), along each datapath, the meta data that is selected by the first multiplexer 103 is routed to the prefetch buffer 104 as a second prefetch operation. For example, prior to the transmission of the last bit of data in the burst, earlier bits of data that have already been transmitted from the prefetch buffer 104 are overwritten with the 2 bits of meta data. The second multiplexer 105 then causes the pair of bits to be transmitted in series at the end of the burst. With 2 bits of data being transmitted over a 4b wide data bus, a byte of meta data is transferred for the burst.

Figure 4B:
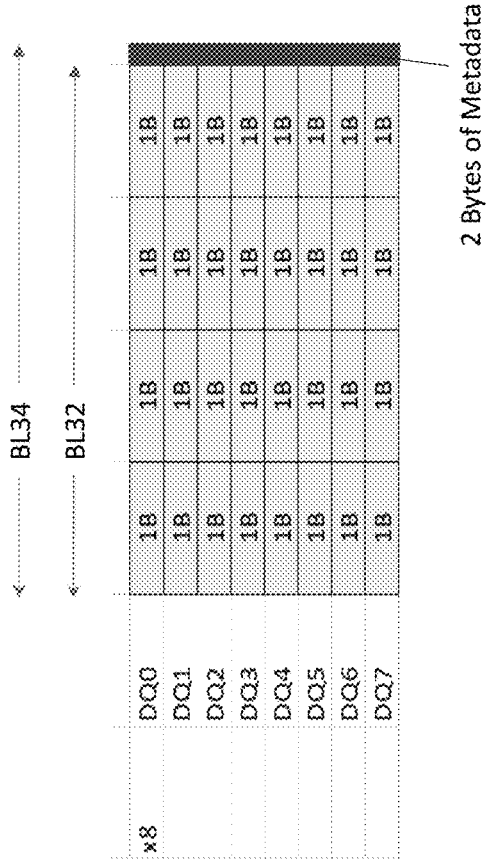
FIGS. 4a and 4b show a first embodiment of operation for an X8 memory.
Figure 4A:
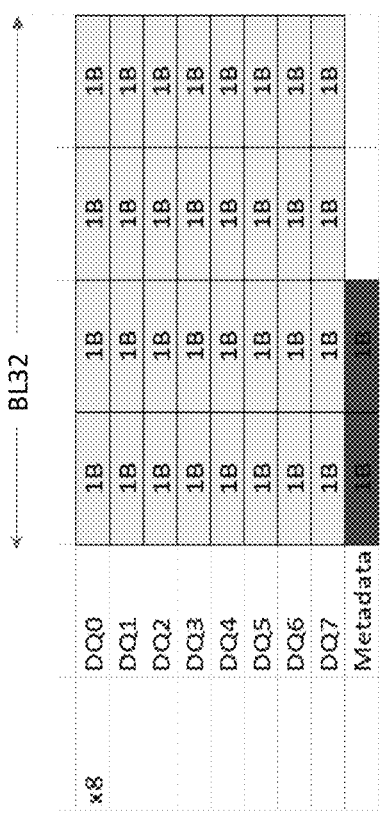
Figures 5A, 5B:
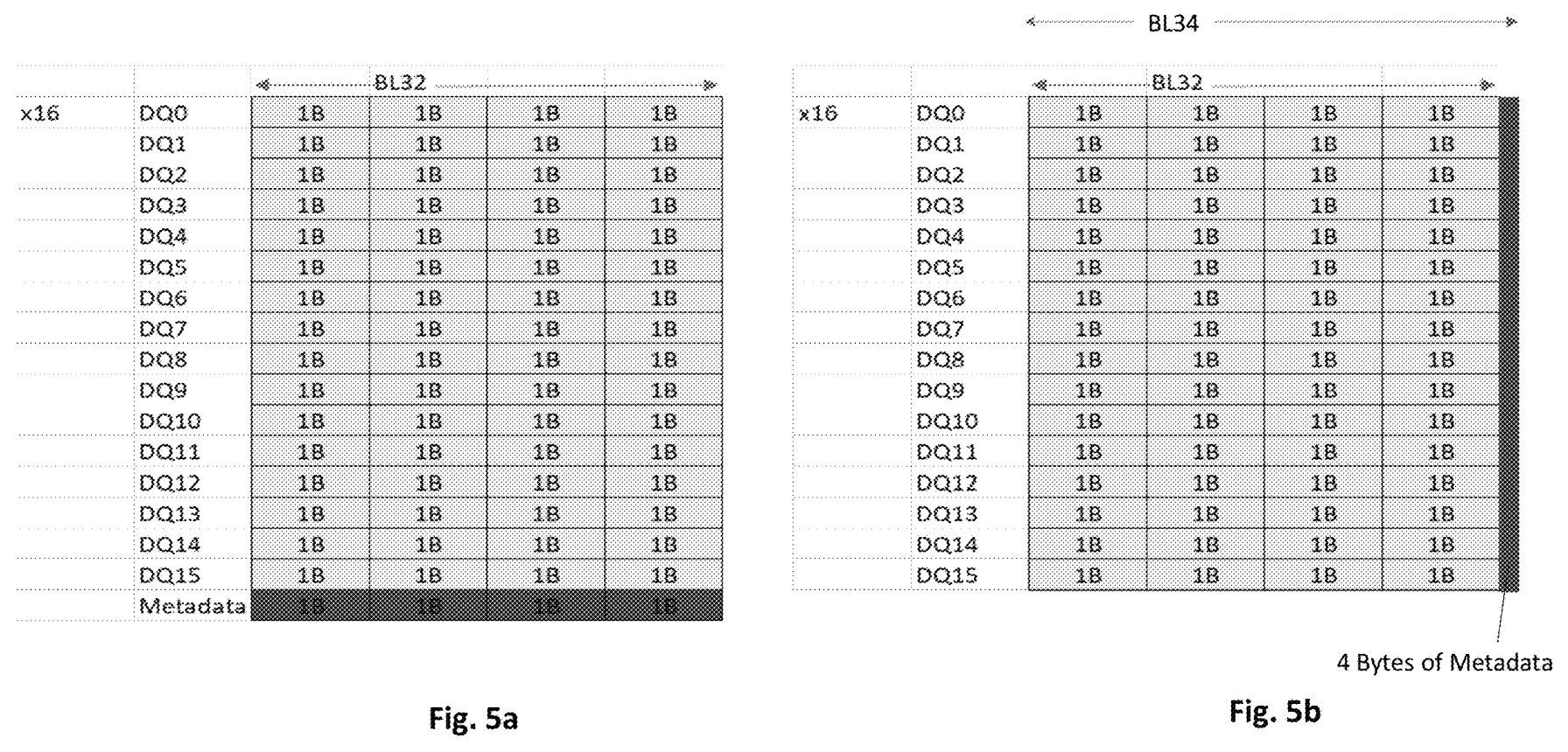

The above discussion pertained to an X4 memory. The above discussion can be readily extended to other memories having a different number of data I/Os such as X8 memory (X=8) and an X16 memory (X=16). FIGS. 4a and 4b shows examples of the burst transfers for an X8 memory and FIGS. 5a and 5b show examples for an X16 memory.

With respect to the operation of the X8 memory (FIGS. 4a and 4b), the transmission of one byte of meta data per burst across four I/Os results in two bytes of meta data being transferred per burst. With respect to the operation of the X16 memory (FIGS. 5a and 5b), the transmission of one byte of meta data per burst across four I/Os results in four bytes of meta data being transferred per burst.

The discussion of FIG. 1 can be readily expanded to describe both X8 and X16 memories. In the additional pin approach for an X8 memory (FIG. 4a), the additional pre fetch buffer 107 will 16b of meta data (2b from each of eight arrays). The 16b corresponds to two bytes which are transferred serially over the additional pin. With respect to the approach that does not have an additional pin (FIG. 4b), each of the eight datapaths receives and transmits 2b of meta data at the end of the data burst as discussed above which results in a total of two bytes of meta data being transferred for the burst. The X16 memory (FIGS. 5a and 5b) scales similarly.

In an embodiment, the association of a byte of meta data per burst across four I/Os is a nominal operating point for meta data support. In further embodiments, the memory can be specially configured through mode register (MR) space 109 to support additional meta data transfers per burst. For example, according to one approach, MR space 109 allows a user to configure two bytes of meta data information per burst across four data I/Os (instead of one byte of meta data information).

Figure 6:
FIG. 6 shows a page with first and second sections sequestered for meta data.

When the MR space is configured to enable the additional meta data per burst, as observed in FIG. 6, another section 602 in the page is sequestered for meta data. As such, per page, K-2 sections are used for data and 2 sections are used for meta data (the host is expected to understand that only K-2 sections of the page are to be used for data). According to one approach, the field size within a section that is dedicated to the storage of the meta data for a particular one of the page's data sections is doubled.

For example, continuing again with the example where n=5 and a page is composed of 32 sections of 64b along a single datapath, each requested section 601, 602 is divided into 4b fields where each field is dedicated to a particular one of the page's data sections. The second prefetch of meta data (the prefetch that occurs after the data has been prefetched) therefore prefetches 4b of meta data rather than 2b of meta data.

In an embodiment, the highest ordered bit of the lower ordered n bits is used to select one of the sequestered sections 601, 602. The remaining bits of the lower ordered n bits are used to select the appropriate 4b field in the particular sequestered section. For example, again if n=5, C4 determines which of sequestered sections 601, 602 is invoked and bits C0-C3 determine the particular field within the invoked sequestered section.

Figure 7B:
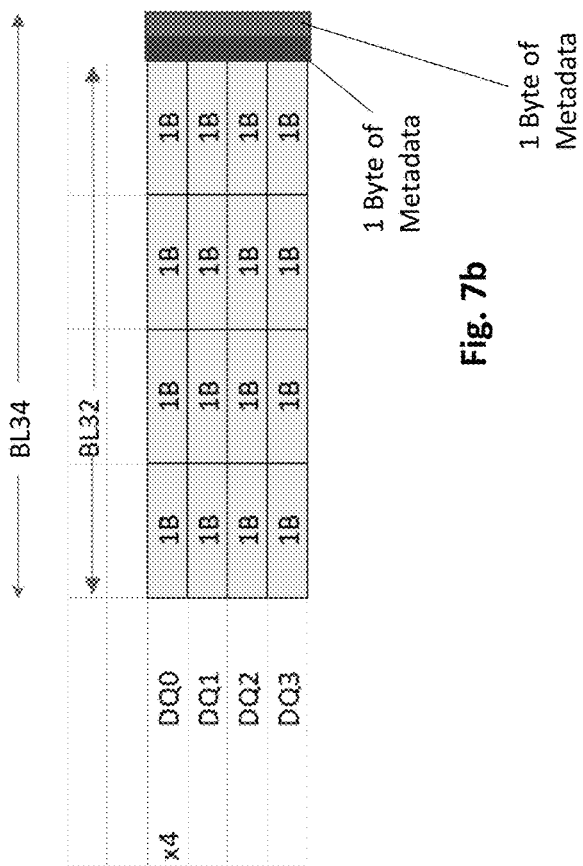
FIGS. 7a and 7b show a second embodiment of operation for an X4 memory.
Figure 7A:
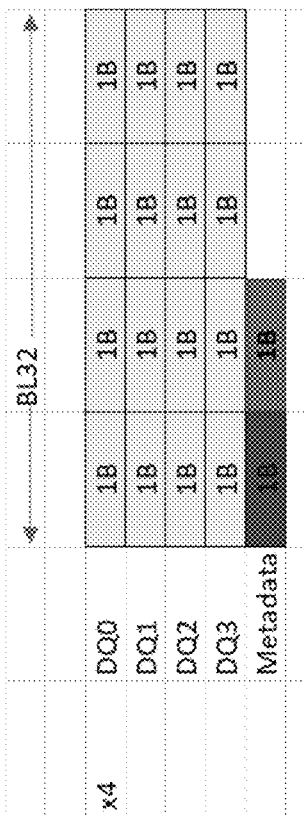
Figures 8A, 8B:
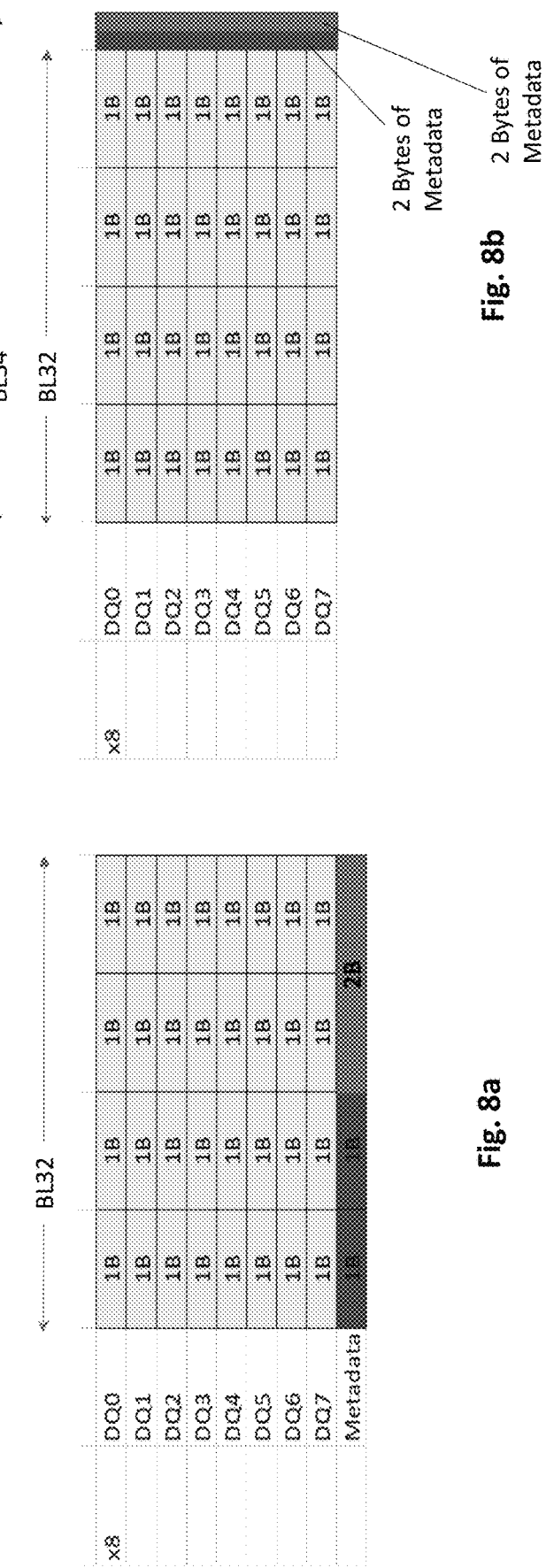
FIGS. 8a and 8b show a second embodiment of operation for an X8 memory.
Figure 9B:
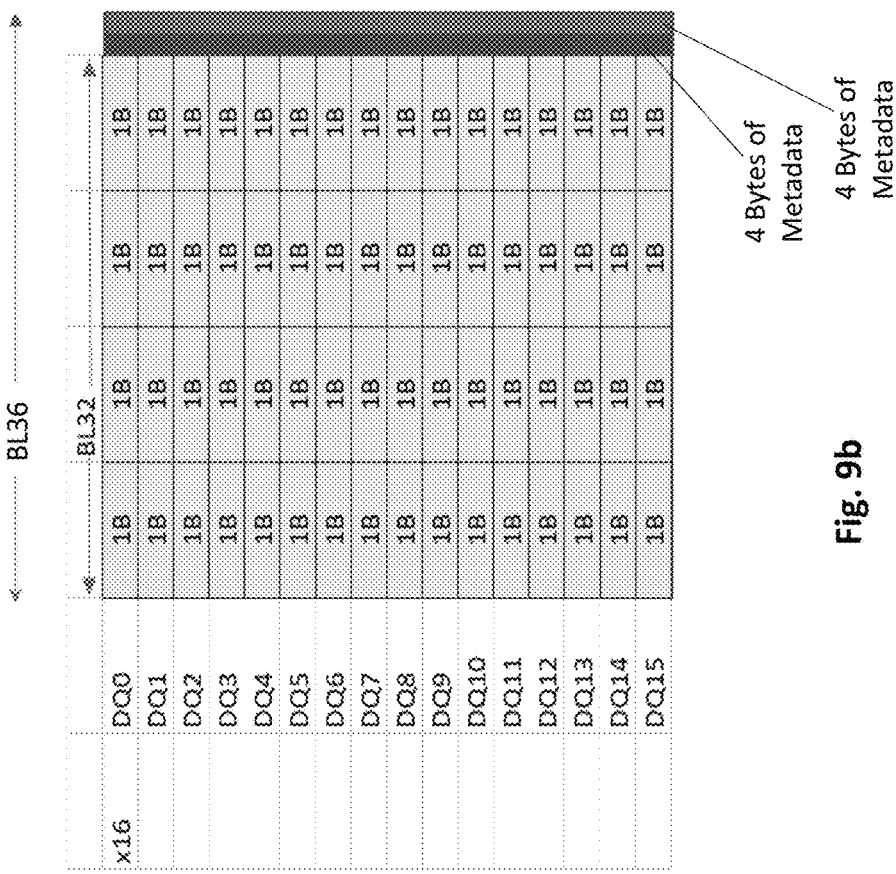
FIGS. 9a and 9b shows a second embodiment of operation for an X16 memory.
Figure 9A:
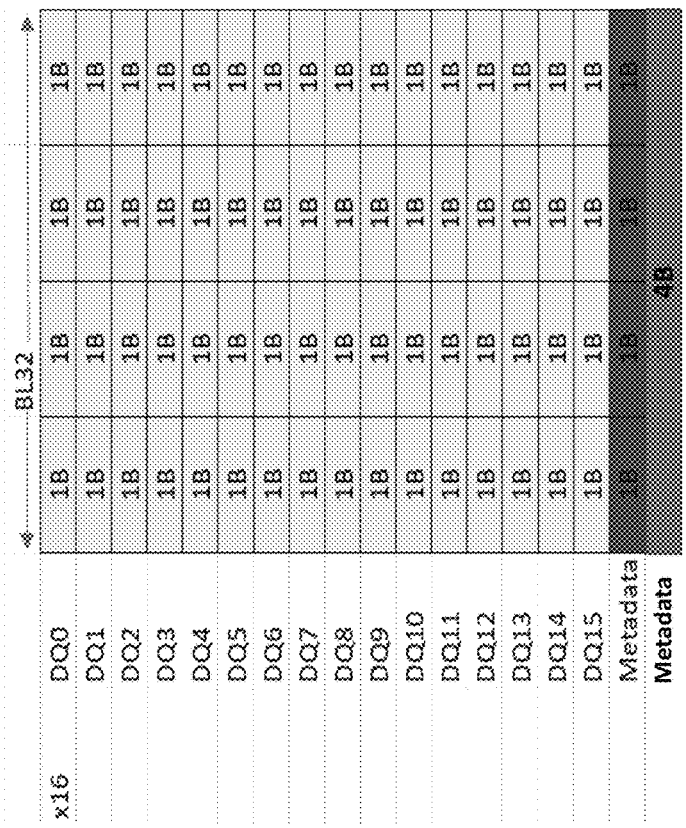

Operation is as described above. FIGS. 7a and 7b show X4 operation, FIGS. 8a and 8b show X8 operation and FIGS. 9a and 9b show X16 operation. Again, approaches with an additional pin and without an additional pin are shown. For an X16 memory, two additional pins are utilized.

Write bursts are performed similarly but in reverse to the operations described above.

Referring back to FIG. 1, a memory controller 110 is coupled to the memory 100. Apart from logic circuitry (not shown) to perform the data transfers in both read and write directions as described above (including circuitry to receive read data, transmit write data and apply address bits such as the column address bits, write to the MR space, etc.), the memory controller 110 also includes logic circuitry 111 that is designed to properly prepare and transmit the meta data during a write operation according to any of the above described burst operations, and/or, properly receive the meta data during a read operation according to any of the above described burst operations.

The meta data that is stored in the memory chips can have any of multiple uses such as storing any/all of the following kinds of meta data: security, directory, poison, cache tags, integrity, encryption, decryption, compression, memory hierarchy bits.

Although embodiments above have stressed one or two bytes of meta data per burst per four I/O pins and 32B data bursts, it is pertinent to point out that the teachings above can be readily scaled to other amounts of meta data per number of I/O pins per burst (e.g., by allocating more or less sections per page, by sequestering more of less sections per page, etc.) and/or other amounts of data per burst (e.g., 16B, 64B, etc.).

Figure 10:
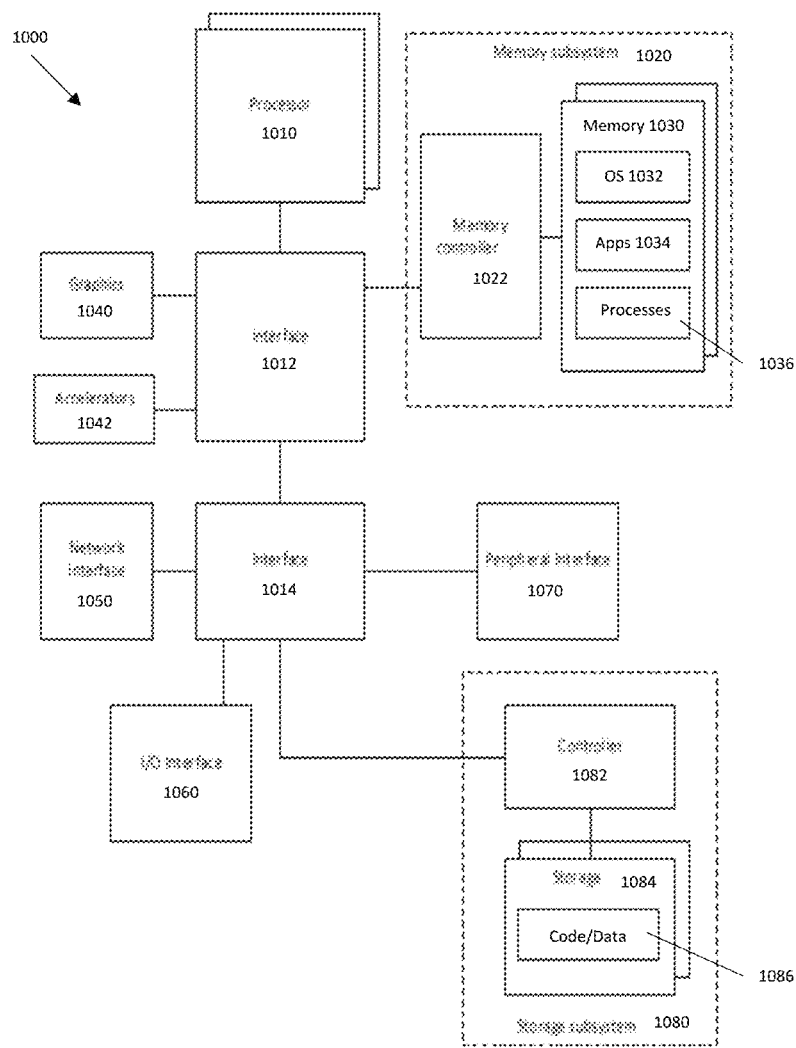
FIG. 10 shows a computing system.

FIG. 10 depicts an example system. The system can use a memory that includes meta data with data bursts as described above. System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 1040 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

Accelerators 1042 can be a fixed function offload engine that can be accessed or used by a processor 1010. For example, an accelerator among accelerators 1042 can provide compression (DC) capability, cryptography services such as public key encryption (PKE), cipher, hash/authentication capabilities, decryption, or other capabilities or services. In some embodiments, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), "X" processing units (XPUs), programmable control logic, and programmable processing elements such as field programmable gate arrays (FPGAs). Accelerators 1042 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, volatile memory, or a combination of such devices. Memory 1020 can be implemented with memory that includes meta data with bursts as described at length above.

Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010. In some examples, a system on chip (SOC or SoC) combines into one SoC package one or more of: processors, graphics, memory, memory controller, and Input/Output (I/O) control logic.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications (e.g., DDR6). The JEDEC standards are available at www.jedec.org.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect express (PCIe) bus, a HyperTransport or industry standard architecture (ISA) bus, a small computer system interface (SCSI) bus, Remote Direct Memory Access (RDMA), Internet Small Computer Systems Interface (iSCSI), NVM express (NVMe), Coherent Accelerator Interface (CXL), Coherent Accelerator Processor Interface (CAPI), a universal serial bus (USB), or an Institute of Electrical and Electronics Engineers (IEEE) standard 1394 bus.

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a remote device, which can include sending data stored in memory. Network interface 1050 can receive data from a remote device, which can include storing received data into memory. Various embodiments can be used in connection with network interface 1050, processor 1010, and memory subsystem 1020.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage subsystem 1080 can overlap with components of memory subsystem 1020. Storage subsystem 1080 includes storage device(s), represented by storage 1084, which can be or include any conventional medium for storing large amounts of data in a nonvolatile manner, such as one or more magnetic, solid state, or optical based disks, or a combination. Storage 1084 holds code or instructions and data 1086 in a persistent state (e.g., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (e.g., the value or state of the data is indeterminate if power is interrupted to system 1000). In one example, storage subsystem 1080 includes controller 1082 to interface with storage 1084. In one example controller 1082 is a physical part of interface 1014 or processor 1010 or can include circuits or logic in both processor 1010 and interface 1014.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1000. More specifically, power source typically interfaces to one or multiple power supplies in system 1200 to provide power to the components of system 1000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1000 can be implemented as a disaggregated computing system. For example, the system 1000 can be implemented with interconnected compute sleds of processors, memories, storages, network interfaces, and other components. High speed interconnects can be used such as PCIe, Ethernet, or optical interconnects (or a combination thereof). For example, the sleds can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Figure 11:
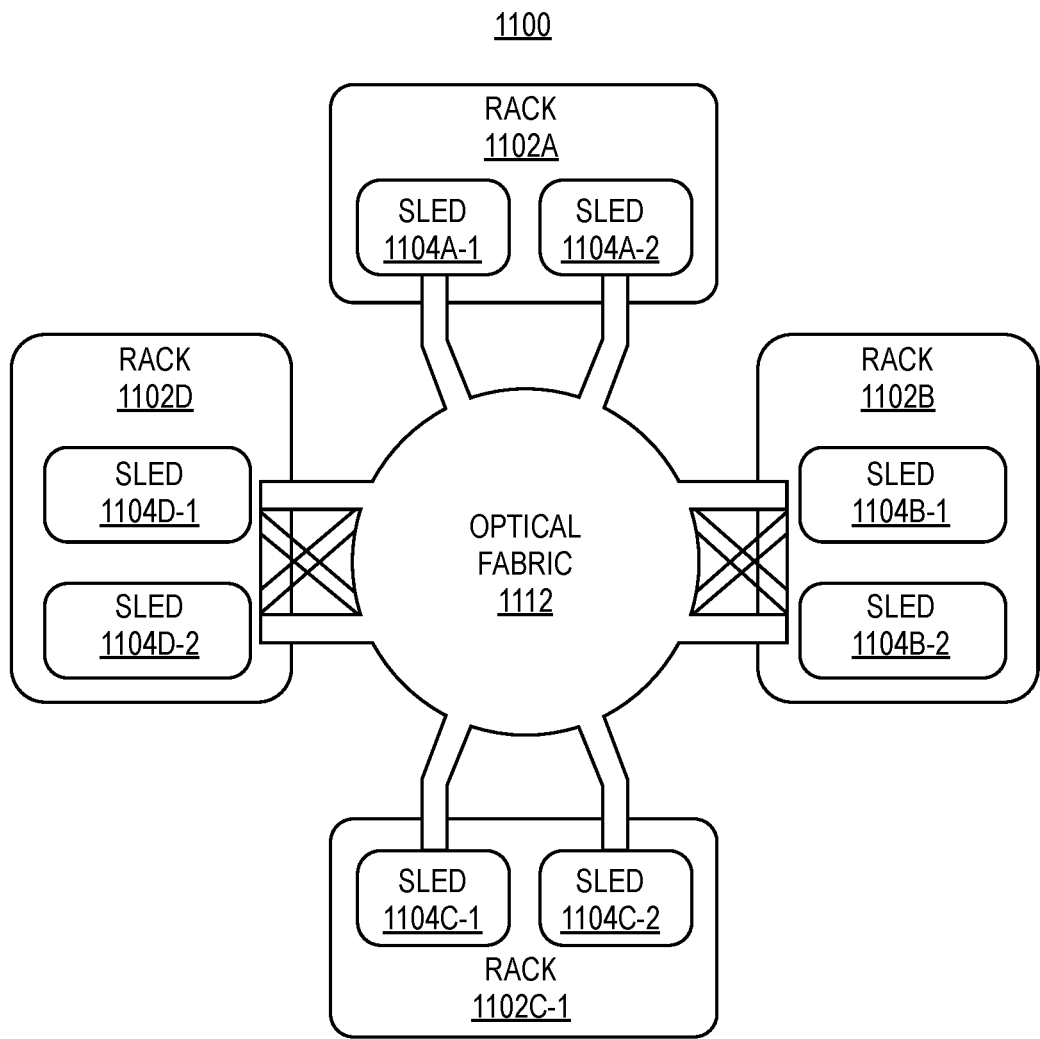
FIG. 11 shows a data center.

FIG. 11 depicts an example of a data center. Various embodiments can be used in or with the data center of FIG. 11. As shown in FIG. 11, data center 1100 may include an optical fabric 1112. Optical fabric 1112 may generally include a combination of optical signaling media (such as optical cabling) and optical switching infrastructure via which any particular sled in data center 1100 can send signals to (and receive signals from) the other sleds in data center 1100. However, optical, wireless, and/or electrical signals can be transmitted using fabric 1112. The signaling connectivity that optical fabric 1112 provides to any given sled may include connectivity both to other sleds in a same rack and sleds in other racks. Data center 1100 includes four racks 1102A to 1102D and racks 1102A to 1102D house respective pairs of sleds 1104A-1 and 1104A-2, 1104B-1 and 1104B-2, 1104C-1 and 1104C-2, and 1104D-1 and 1104D-2. Thus, in this example, data center 1100 includes a total of eight sleds. Optical fabric 1112 can provide sled signaling connectivity with one or more of the seven other sleds. For example, via optical fabric 1112, sled 1104A-1 in rack 1102A may possess signaling connectivity with sled 1104A-2 in rack 1102A, as well as the six other sleds 1104B-1, 1104B-2, 1104C-1, 1104C-2, 1104D-1, and 1104D-2 that are distributed among the other racks 1102B, 1102C, and 1102D of data center 1100. The embodiments are not limited to this example. For example, fabric 1112 can provide optical and/or electrical signaling.

Figure 12:
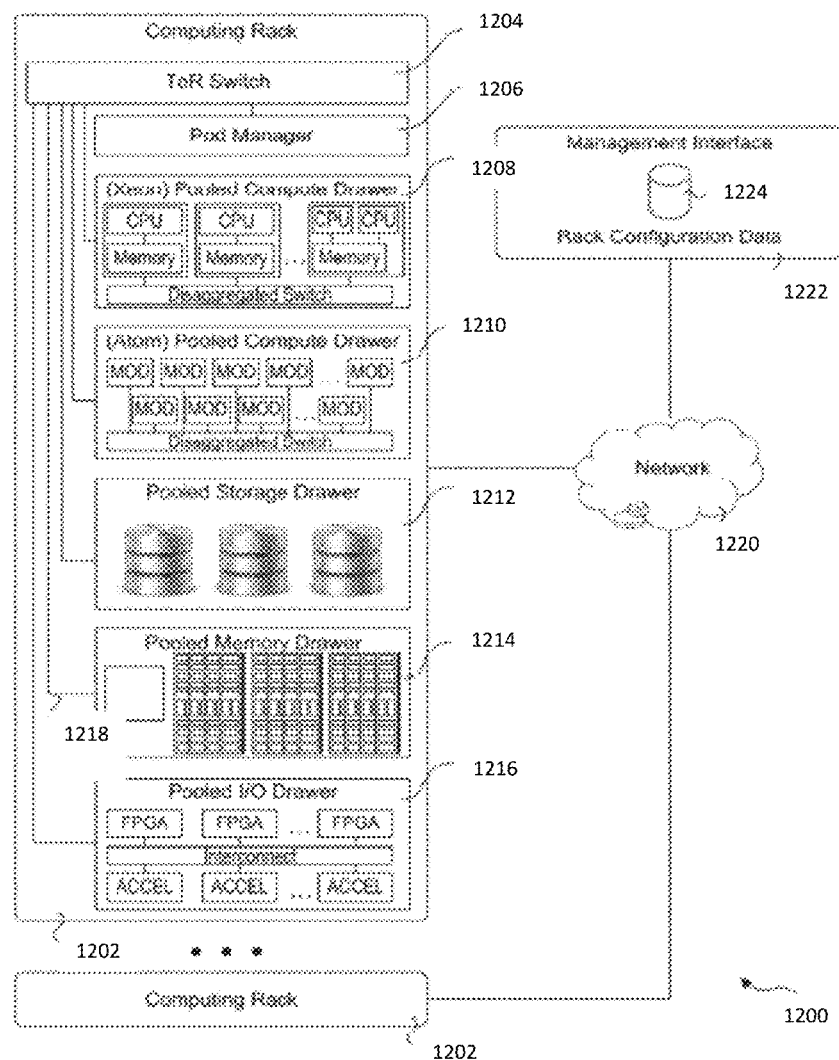
FIG. 12 shows a rack.

FIG. 12 depicts an environment 1200 includes multiple computing racks 1202, each including a Top of Rack (ToR) switch 1204, a pod manager 1206, and a plurality of pooled system drawers. Generally, the pooled system drawers may include pooled compute drawers and pooled storage drawers to, e.g., effect a disaggregated computing system. Optionally, the pooled system drawers may also include pooled memory drawers and pooled Input/Output (I/O) drawers. In the illustrated embodiment the pooled system drawers include an INTEL® XEON® pooled computer drawer 1208, and INTEL® ATOM™ pooled compute drawer 210, a pooled storage drawer 212, a pooled memory drawer 214, and an pooled I/O drawer 1216. Each of the pooled system drawers is connected to ToR switch 1204 via a high-speed link 1218, such as a 40 Gigabit/second (Gb/s) or 100 Gb/s Ethernet link or an 100+Gb/s Silicon Photonics (SiPh) optical link. In one embodiment high-speed link 1218 comprises an 800 Gb/s SiPh optical link.

Again, the drawers can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Multiple of the computing racks 1200 may be interconnected via their ToR switches 1204 (e.g., to a pod-level switch or data center switch), as illustrated by connections to a network 1220. In some embodiments, groups of computing racks 1202 are managed as separate pods via pod manager(s) 1206. In one embodiment, a single pod manager is used to manage all of the racks in the pod. Alternatively, distributed pod managers may be used for pod management operations.

RSD environment 1200 further includes a management interface 1222 that is used to manage various aspects of the RSD environment. This includes managing rack configuration, with corresponding parameters stored as rack configuration data 1224.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

A memory has been described. The memory includes row buffer circuitry to store a page. The page is divided into sections. At least one of the sections of the page is to be sequestered for the storage of meta data. A first subset of column address bits is to: 1) define a particular section of the page, other than the at least one sequestered sections of the page, whose data is targeted by a burst access; and, 2) define a field within the at least one of the sequestered sections of the page that stores meta data for the particular section.

In various embodiments the memory includes a prefetch buffer that is to receive the data with a first prefetch and receive the meta data with a second prefetch.

In various embodiments the field corresponds to one byte of meta data per burst. In further embodiments, the memory further comprises mode register space to extend the field to two bytes of meta data per four data I/O pins.

In various embodiments the meta data is transferred over a different I/O pin than data I/O pins over which the data is transferred. In various embodiments the meta data is transferred over data I/O pins over which the data is also transferred. In various embodiments the burst comprises 32 data transfers. In various embodiments the memory is one of: an X4 memory; an X8 memory; an X16 memory.

A computing system has been described. The computing system includes a network interface; a plurality of processing cores; and a memory controller coupled to the plurality of processing cores. A memory as described above is coupled to the memory controller.

A memory controller has been described. The memory controller includes circuitry to access a page with a burst access. The page is within a memory chip. The page is divided into sections. At least one of the sections of the page is sequestered for the storage of meta data. A first subset of column address bits sent by the memory controller to the memory chip is to: 1) define a particular section of the page, other than the at least one sequestered sections of the page, whose data is targeted by the burst operation; and, 2) define a field within the at least one of the sequestered sections of the page that stores meta data for the particular section.

In various embodiments of the memory controller, the meta data is transferred over a different I/O pin than data I/O pins over which the data is transferred. In various embodiments of the memory controller the meta data is transferred over data I/O pins over which the data is also transferred. In various embodiments the field corresponds to one byte of meta data per burst.

The invention claimed is:

1. A memory, comprising:
row buffer circuitry to store a page, the page divided into sections, wherein, at least one of the sections of the page is to be sequestered for the storage of meta data, and wherein, a first subset of column address bits is to: 1) define a particular section of the page, other than the at least one sequestered sections of the page, whose data is targeted by a burst access; and, 2) define a field within the at least one of the sequestered sections of the page that stores meta data for the particular section; and
a prefetch buffer that is to receive the data with a first prefetch and receive the meta data with a second prefetch.

2. The memory of claim 1 wherein the field corresponds to one byte of meta data per burst.

3. The memory of claim 1 wherein the memory further comprises mode register space to extend the field to two bytes of meta data per four data I/O pins.

4. The memory of claim 1 wherein the meta data is transferred over a different I/O pin than data I/O pins over which the data is transferred.

5. The memory of claim 1 wherein the meta data is transferred over data I/O pins over which the data is also transferred.

6. The memory of claim 1 wherein the burst comprises 32 data transfers.

7. The memory of claim 1 wherein the memory is one of:
an X4 memory;
an X8 memory;
an X16 memory.

8. A computing system, comprising:
a network interface;
a plurality of processing cores;
a memory controller coupled to the plurality of processing cores;
a memory coupled to the memory controller, the memory comprising
row buffer circuitry to store a page, the page divided into sections, wherein, at least one of the sections of the page is to be sequestered for the storage of meta data, and wherein, a first set of column address bits is to: 1) define a particular section of the page, other than the at least one sequestered sections of the page, whose data is targeted by a burst access; and, 2) define a field within the at least one of the sequestered sections of the page that stores meta data for the particular section; and
a prefetch buffer that is to receive the data with a first prefetch and receive the meta data with a second prefetch.

9. The computing system of claim 8 wherein the field corresponds to one byte of meta data per burst per four data I/O pins.

10. The computing system of claim 8 wherein the memory further comprises mode register space to extend the field to two bytes of meta data per four data I/O pins.

11. The computing system of claim 8 wherein the meta data is transferred over a different I/O pin than data I/O pins over which the data is transferred.

12. The computing system of claim 8 wherein the meta data is transferred over data I/O pins over which the data is also transferred.

13. The computing system of claim 8 wherein the burst comprises 32 data transfers.

14. The computing system of claim 8 wherein the memory is one of:
an X4 memory;
an X8 memory;
an X16 memory.

15. A memory controller, comprising:
interface circuitry to couple to a memory chip having row buffer circuitry and a prefetch buffer, the interface circuitry to access a page of the memory chip with a burst operation, the page divided into sections, wherein, at least one of the sections of the page is sequestered for the storage of meta data, and wherein, a first subset of column address bits sent by the memory controller to the memory chip is to: 1) define a particular section of the page, other than the at least one sequestered sections of the page, whose data is targeted by the burst operation; and, 2) define a field within the at least one of the sequestered sections of the page that stores meta data for the particular section; wherein the prefetch buffer of the memory chip is to access the data with a first prefetch and receive the meta data with a second prefetch.

16. The memory controller of claim 15 wherein the meta data is transferred over a different I/O pin than data I/O pins over which the data is transferred.

17. The memory controller of claim 15 wherein the meta data is transferred over data I/O pins over which the data is also transferred.

18. The memory controller of claim 15 wherein the field corresponds to one byte of meta data per burst per four data I/O pins.

\* \* \* \* \*